(12) United States Patent
Haneda et al.

(10) Patent No.: US 8,032,793 B2
(45) Date of Patent: Oct. 4, 2011

(54) METHOD OF CONTROLLING INFORMATION PROCESSING SYSTEM, INFORMATION PROCESSING SYSTEM, DIRECT MEMORY ACCESS CONTROL DEVICE AND PROGRAM

(75) Inventors: Terumasa Haneda, Kawasaki (JP); Yuichi Ogawa, Kawasaki (JP); Yuuji Hanaoka, Kawasaki (JP); Toshiyuki Yoshida, Kawasaki (JP); Hidenori Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 952 days.

(21) Appl. No.: 11/237,767

(22) Filed: Sep. 29, 2005

(65) Prior Publication Data
US 2006/0159115 A1    Jul. 20, 2006

(30) Foreign Application Priority Data
Jan. 14, 2005    (JP) .................... 2005-008006

(51) Int. Cl.
*G06F 11/00* (2006.01)
(52) U.S. Cl. .............. 714/43; 714/42; 714/4.2; 710/301
(58) Field of Classification Search ............... 714/43, 714/42, 4.2; 710/301
See application file for complete search history.

(56) References Cited

U.S. PATENT DOCUMENTS

| | | | | |
|---|---|---|---|---|
| 5,173,689 A | * | 12/1992 | Kusano ........................ | 370/225 |
| 5,317,569 A | * | 5/1994 | Ralph et al. .................. | 370/223 |
| 5,499,381 A | * | 3/1996 | Shibamiya .................... | 712/40 |
| 5,535,192 A | * | 7/1996 | Trubey et al. ................. | 370/223 |
| 6,012,150 A | * | 1/2000 | Bartfai et al. ................. | 714/4 |
| 6,032,266 A | | 2/2000 | Ichinohe et al. | |
| 6,138,199 A | * | 10/2000 | Fleischer ..................... | 710/316 |
| 6,336,151 B1 | | 1/2002 | Seki | |
| 6,389,555 B2 | * | 5/2002 | Purcell et al. ................. | 714/10 |
| 6,496,880 B1 | * | 12/2002 | Ma et al. ..................... | 710/38 |
| 6,542,961 B1 | | 4/2003 | Matsunami et al. | |
| 6,662,219 B1 | * | 12/2003 | Nishanov et al. ............. | 709/220 |
| 6,691,245 B1 | * | 2/2004 | DeKoning .................... | 714/6 |
| 6,732,218 B2 | * | 5/2004 | Overtoom et al. ............ | 710/313 |
| 6,732,289 B1 | * | 5/2004 | Talagala et al. .............. | 714/6 |

(Continued)

FOREIGN PATENT DOCUMENTS

JP    63-308658    12/1988

(Continued)

OTHER PUBLICATIONS

David Mayhew and Venkata Krishnan, PCI Express and Advanced Switching: Evolutionary Path to Building Next Generation Interconnects.*

(Continued)

*Primary Examiner* — Scott Baderman
*Assistant Examiner* — Loan Truong
(74) *Attorney, Agent, or Firm* — Fujitsu Patent Center

(57) ABSTRACT

In a method of controlling an information processing system in which an information processing device is connected to each of a plurality of input/output ports provided in a routing device and having a first property or a second property, for conducting data transmission among the information processing devices via the routing device, a step of causing all of the information processing devices to halt data transmission, a step of resetting properties and identification information of the input/output ports with the second properties other than the input/output port with the first property which cannot be used, in the routing device, and a step of causing the information processing devices to restart the data transmission after the reset of the identification information are executed.

14 Claims, 6 Drawing Sheets

U.S. PATENT DOCUMENTS

| | | | |
|---|---|---|---|
| 6,938,084 B2 * | 8/2005 | Gamache et al. | 709/226 |
| 6,986,076 B1 * | 1/2006 | Smith et al. | 714/4 |
| 7,039,827 B2 * | 5/2006 | Meyer et al. | 714/4.11 |
| 7,293,195 B1 * | 11/2007 | Watanabe et al. | 714/9 |
| 7,350,014 B2 * | 3/2008 | Kapoor et al. | 710/308 |
| 7,415,551 B2 * | 8/2008 | Pescatore | 710/62 |
| 2002/0188711 A1 * | 12/2002 | Meyer et al. | 709/223 |
| 2002/0194371 A1 * | 12/2002 | Kadoi | 709/239 |
| 2003/0120819 A1 * | 6/2003 | Abramson et al. | 709/250 |
| 2003/0133712 A1 | 7/2003 | Arikawa et al. | |
| 2003/0141093 A1 * | 7/2003 | Tirosh et al. | 174/72 A |
| 2004/0019726 A1 * | 1/2004 | Kelley et al. | 710/305 |
| 2004/0019729 A1 * | 1/2004 | Kelley et al. | 710/306 |
| 2004/0264472 A1 * | 12/2004 | Oliver et al. | 370/395.4 |
| 2005/0015531 A1 | 1/2005 | Yabuta et al. | |
| 2005/0089015 A1 * | 4/2005 | Tsuge et al. | 370/351 |
| 2005/0102437 A1 * | 5/2005 | Pettey et al. | 710/1 |
| 2005/0229034 A1 * | 10/2005 | Fujibayashi | 714/11 |
| 2005/0240703 A1 * | 10/2005 | Nguyen et al. | 710/301 |
| 2005/0246450 A1 * | 11/2005 | Enko et al. | 709/230 |
| 2005/0270974 A1 * | 12/2005 | Mayhew | 370/229 |
| 2005/0270988 A1 * | 12/2005 | DeHaemer | 370/254 |
| 2006/0050722 A1 * | 3/2006 | Bury et al. | 370/403 |
| 2006/0056400 A1 * | 3/2006 | Griggs | 370/360 |
| 2006/0072615 A1 * | 4/2006 | Narad et al. | 370/474 |
| 2006/0112199 A1 * | 5/2006 | Sonksen et al. | 710/22 |
| 2006/0143311 A1 * | 6/2006 | Madukkarumukumana et al. | 710/1 |
| 2006/0206655 A1 * | 9/2006 | Chappell et al. | 710/315 |

FOREIGN PATENT DOCUMENTS

| | | |
|---|---|---|
| JP | 3-139751 A | 6/1991 |
| JP | 5-307516 | 11/1993 |
| JP | 9-321804 A | 12/1997 |
| JP | 11-203231 A | 7/1999 |
| JP | 2001-101125 A | 4/2001 |
| JP | 2002-64511 A | 2/2002 |
| JP | 2002-342255 | 11/2002 |
| JP | 3091475 | 11/2002 |
| JP | 2003-174451 A | 6/2003 |
| JP | 2004-15576 A | 1/2004 |
| JP | 2004-104186 A | 4/2004 |
| JP | 2004-145901 A | 5/2004 |
| JP | 2004-186745 A | 7/2004 |
| JP | 2004-532442 A | 10/2004 |
| JP | 2004-355351 A | 12/2004 |
| WO | WO-03/101144 | 12/2003 |

OTHER PUBLICATIONS

"Japanese Notice of Rejection Ground", Complete English-language translation, mailed May 12, 2009 from JP Patent Office for corresponding JP App. No. 2005-008006.

Japanese Office Action for Japanese Application No. 2005-8006 mailed Nov. 10, 2009. A Partial English-language Translation is Provided.

* cited by examiner

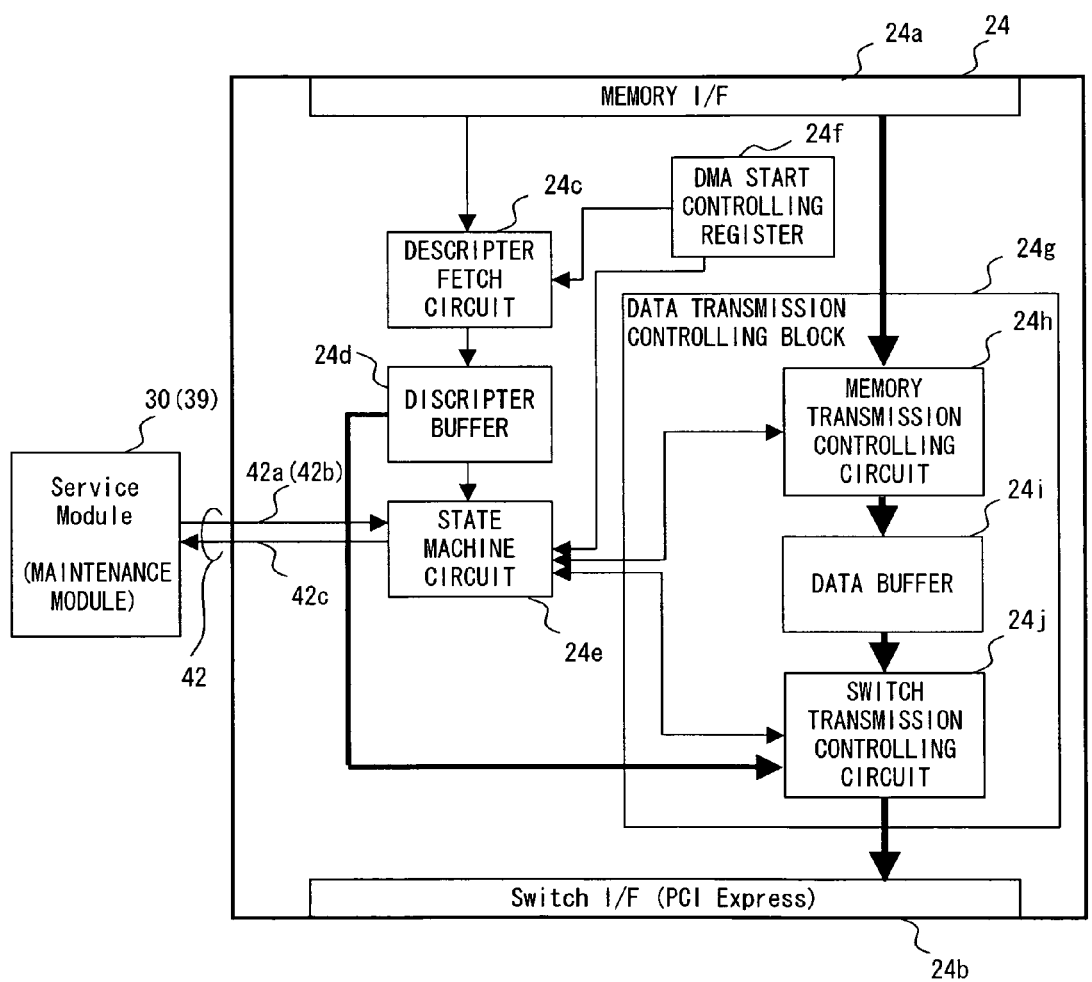
F I G. 4

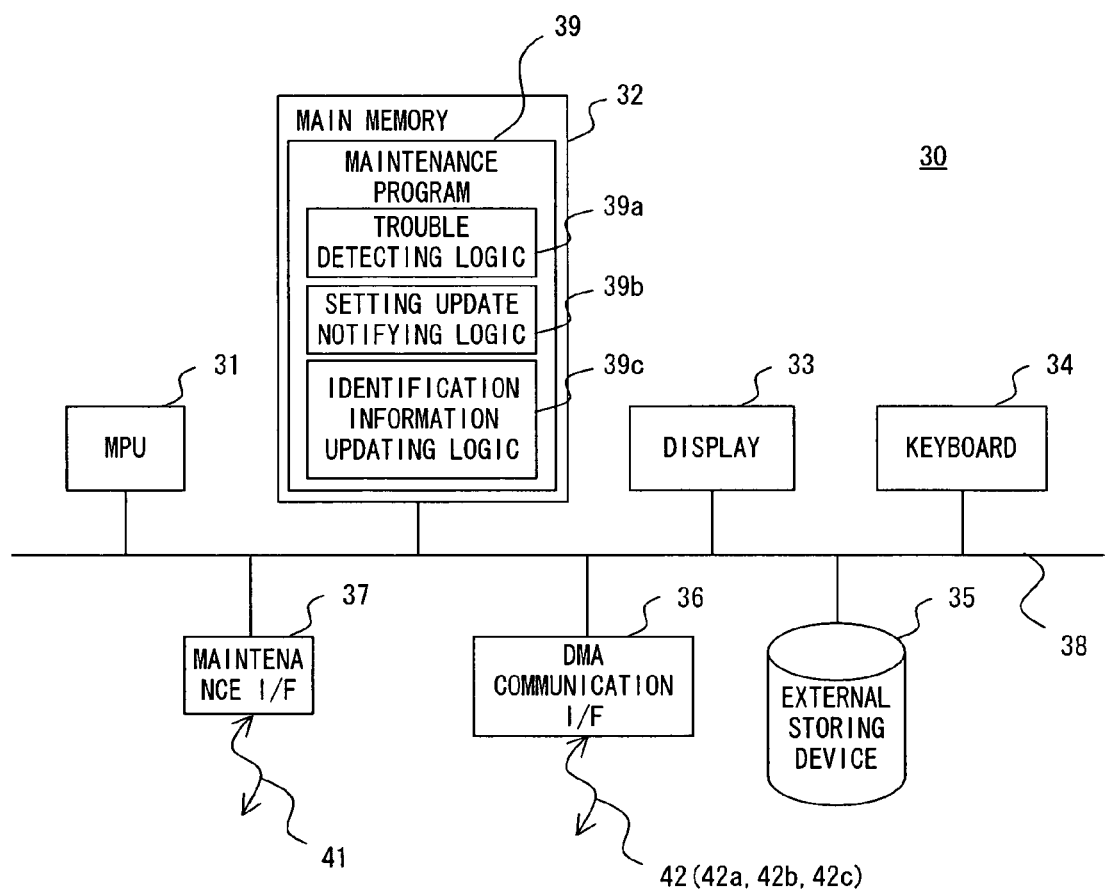
F I G. 5

METHOD OF CONTROLLING INFORMATION PROCESSING SYSTEM, INFORMATION PROCESSING SYSTEM, DIRECT MEMORY ACCESS CONTROL DEVICE AND PROGRAM

BACKGROUND OF THE INVENTION

1. Field of the Invention

The present invention relates to a technique for processing information, and particularly to a technique which can be effectively applied to, for example, an information processing system in which information is transmitted among a plurality of modules on a PCI_Express architecture and to a controlling technique thereof and the like.

2. Description of the Related Art

As an I/O connection interface for connecting an input/output device to a host device, the PCI_Express architecture has aroused interest. PCI_Express generally has a configuration as shown as conventional art in FIG. 1, in which a root complex 503 such as a memory bridge or the like for connecting a CPU 501 and memory 502 is connected to an upstream port 505 provided in a PCI_Express switch 504, and other input/output devices (End Point) 507 are connected to downstream ports 506 so that data transmission by packet routing between the upstream port 505 and the downstream ports 506 and among the downstream ports 506 is realized.

In a connection form utilizing the PCI_Express switch 504, port numbers for the downstream ports 506 are set using the single upstream port 505 as a reference, and packet routing is executed among ports using these port numbers as addresses.

The connection configuration shown in the above FIG. 1 shows a case for an information processing system of a relatively small scale such as a personal computer or the like. However, it is also possible that information processing devices which are on the same level as one another are connected respectively to the upstream port 505 and the downstream ports 506 of the PCI_Express switch 504.

In the above case, the same information processing devices are connected to all of the ports of the PCI_Express switch 504 i.e. the upstream port and all of the downstream ports.

In the above configuration, there is a problem such as the case that the information processing device connected to the upstream port is degraded (closed and degenerated) due to a hardware failure or the like.

Specifically, because configuration (setting of port numbers and the like) regarding the downstream ports in the PCI_Express switch 504 can be conducted only by the root complex of an upper level and via the upstream port, an information processing device which is always reliable has to be connected to the upstream port.

Accordingly, at a time when the information processing device connected to the upstream port is degraded, the setting of any one of the downstream ports 506 in the PCI_Express switch 504 has to be updated into the upstream port 505, and the port numbers of all of the ports have to be reset.

However, because the port numbers serving as the reference for packet routing are assigned by using the upstream port 505 as the reference as described above, each port number has to be reset at a time when a property of an arbitrary port is updated from downstream to upstream. The update of the setting is conducted by a maintenance interface or the like such as I2C or the like connected to the PCI_Express switch 504.

However, in an information processing system in which reliability is realized by a redundant connection of a plurality of information processing devices via the PCI_Express switch 504, in order to be basically operated for twenty four hours a day, the above described update of the setting of the PCI_Express switch 504 upon the occurrence of degradation of the upstream port has to be conducted when a power supply for the entire system is in an on state.

Accordingly, communications among ports other than the degraded port have to be stopped temporarily while the update of the setting of the PCI_Express switch 504 is conducted.

When a temporary stop of the communications among information processing devices via the PCI_Express switch 504 as above is conducted under the control of the firmware (software) of each information processing device, the update has to be conducted with the firmware (software) of each of the information processing devices in a state of synchronization, which leads to the technical problem of enormous complexity of the firmware algorithm.

With regard to a connection interface in an information processing device, Japanese Registered Utility Model No. 3091475 discloses a technique in which an input/output device connected to an USB interface is used in common by a plurality of hosts by connecting an upper level interface side of the USB interface to the plurality of the hosts via a multiplexer.

Also, Japanese Patent Application Publication No. 63-308685 discloses a technique in which a fault during a direct memory access operation is detected and when such a fault is detected, the direct memory access requests are masked by the lower level device side and a mask register the mask of which can only be cancelled by the central processing unit side after recovery from the fault is provided so that the plurality of the lower level devices are not affected by the fault occurring during the direct memory access operation, in a bus control device set between a system data bus on a central processing unit side and a local data bus on the lower level device side for conducting bus arbitration of the direct memory access.

Further, Japanese Patent Application Publication No. 2002-342255 discloses a technique in which a USB data converting device comprising a virtual USB host unit to which a plurality of USB devices are connected and a virtual USB device unit to which a plurality of USB hosts are connected is provided in an USB interface which basically assumes a connection configuration of "one to many" between the host and the USB devices, so that data transmission is realized between the plurality of USB hosts and the plurality of USB devices.

However, the above technical problem in the PCI_Express architecture is not recognized in any of the above conventional techniques.

[Patent Document 1]
Japanese Registered Utility Model No. 3091475
[Patent Document 2]
Japanese Patent Application Publication No. 63-308685
[Patent Document 3]
Japanese Patent Application Publication No. 2002-342255

SUMMARY OF THE INVENTION

It is an object of the present invention to realize degeneracy of an input/output port without making the control software of each information processing device complex and without halting the operation of a system in an information processing system with a configuration in which an information processing device is connected to each of a plurality of input/output ports of a routing device.

It is another object of the present invention to realize degeneracy of an upstream port in a PCI_Express switch without making the control software in each information processing device complex in a PCI_Express architecture in which a plurality of information processing devices are connected via the PCI_Express switch.

A first aspect of the present invention provides a method of controlling an information processing system in which an information processing device is connected to each of a plurality of input/output ports provided in a routing device and having a first property or a second property, for conducting data transmission among the information processing devices via the routing device, comprising a step of causing all of the information processing devices to halt data transmission, a step of resetting the properties and the identification information of the input/output ports, other than the input/output port with the first property which cannot be used with the second properties, in the routing device, and a step of causing the information processing devices to restart data transmission after the reset of the identification information.

A second aspect of the present invention provides an information processing system, comprising a routing device comprising a plurality of input/output ports each having a first property or a second property, a first information processing device connected to each of the input/output ports, and a second information processing device for conducting maintenance and management of the routing device and the first information processing device, wherein the second information processing device comprises a fault detecting unit for detecting faults in the information processing device connected to the input/output port with the first property, an update notifying unit for notifying start of update of identification information of the input/output ports and completion of update of the identification information of the input/output ports in the routing device to the first information processing device, and an identification information updating unit for updating the properties and the identification information of the input/output ports with the second properties in the routing device.

A third aspect of the present invention provides a direct memory access control device connected to one of a plurality of input/output ports provided in a routing device, comprising control logic for accepting notification of reset of identification information of the input/output ports and a notification of completion of the reset in the routing device in order to halt data transmission to the input/output port as a connection destination when notification of the reset is received, and to restart the data transmission when notification of completion is received.

A fourth aspect of the present invention provides a program for controlling a computer for maintenance and management of a routing device and direct memory access control devices connected to a plurality of input/output ports of the routing device, wherein the computer is caused to execute a first step of causing all of the direct memory access control devices to halt data transmission, a second step of resetting properties and identification information of the input/output ports other than the input/output port with the first property which cannot be used, in the routing device, and a third step of causing the direct memory access control devices to restart data transmission after the reset of the properties and the identification information.

A fifth aspect of the present invention provides a method of controlling an information processing system with a configuration in which an information processing device is connected to each of a plurality of input/output ports provided in a switch module of PCI_Express architecture, via a direct memory access control device, wherein when the input/output port functioning as an upstream port is closed, the data transmission process is halted in all of the direct memory access control devices, thereafter, reset of port numbers, for identification, of the input/output ports in the switch module is conducted, and the direct memory access control devices are caused to restart the data transmission process after completion of the reset.

According to the above described present invention, in an architecture such as, for example, PCI_Express a switch in which identification information of each input/output port is set by using an input/output port with a particular property (upstream port) as a reference, based on a property of the input/output port, when an information processing device is connected to each input/output port via a direct memory access control device, the direct memory access control device recognizes a start and a completion of a reconfiguration of a PCI_Express switch due to a closure or a degeneracy of the upstream port or the like in order to suppress data transmission to the PCI_Express switch and to restart the data transmission after the completion of the reconfiguration of the PCI_Express switch.

Accordingly, the control software of each of the plurality of the information processing devices connected to the PCI_Express switch can conduct communications there among via the PCI_Express switch without knowledge of the reconfiguration being conducted due to closure of the upstream port or the like in the PCI_Express switch.

BRIEF DESCRIPTION OF THE DRAWINGS

FIG. 4 is a block diagram illustrating, in more detail, a configuration of a DMA controller provided in a part of a central module constituting the information processing system according to the embodiment of the present invention;

FIG. 5 is a block diagram showing an example of a configuration of a service module constituting the information processing system according to the embodiment of the present invention.

DESCRIPTION OF THE PREFERRED EMBODIMENTS

Figure 1:
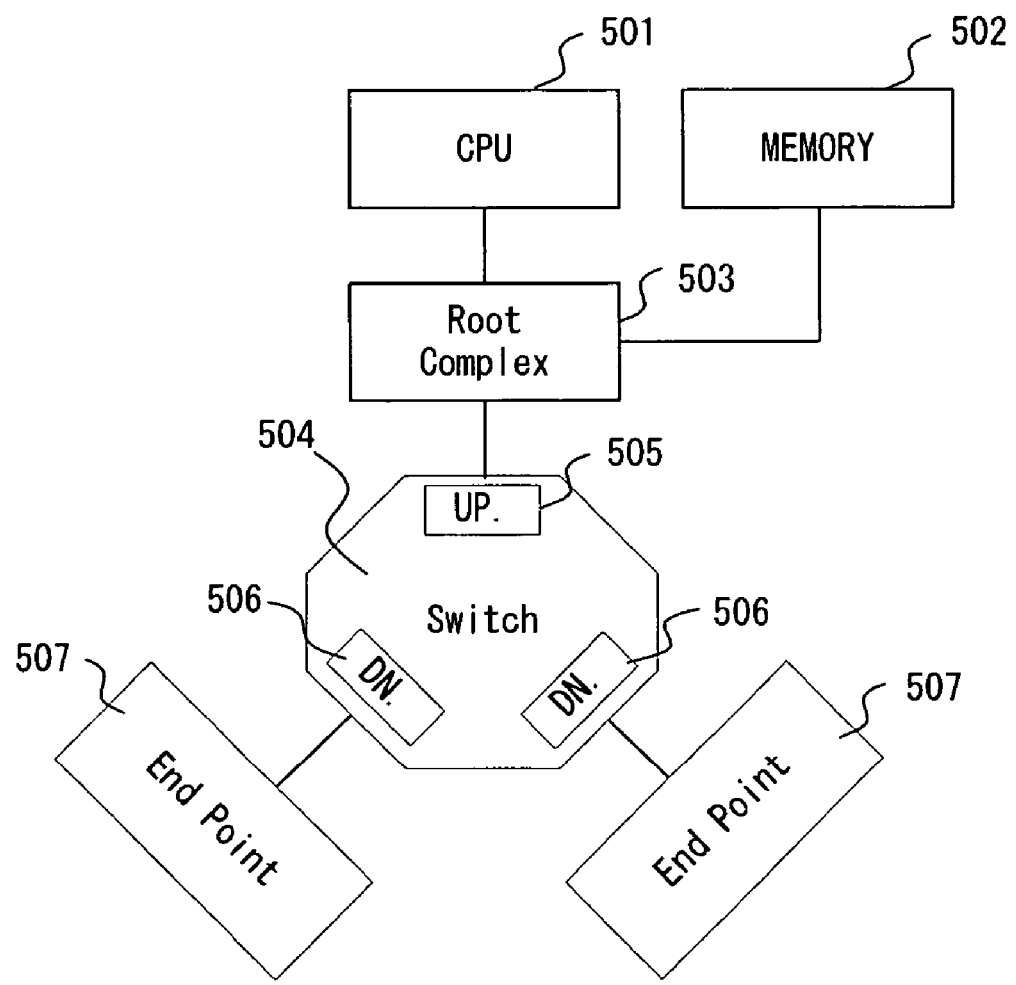
FIG. 1 shows a concept of an example of a configuration of a PCI_Express architecture as a reference art of the present invention.

Hereinafter, embodiments of the present invention are explained in detail, by referring to the drawings.

Figure 2:
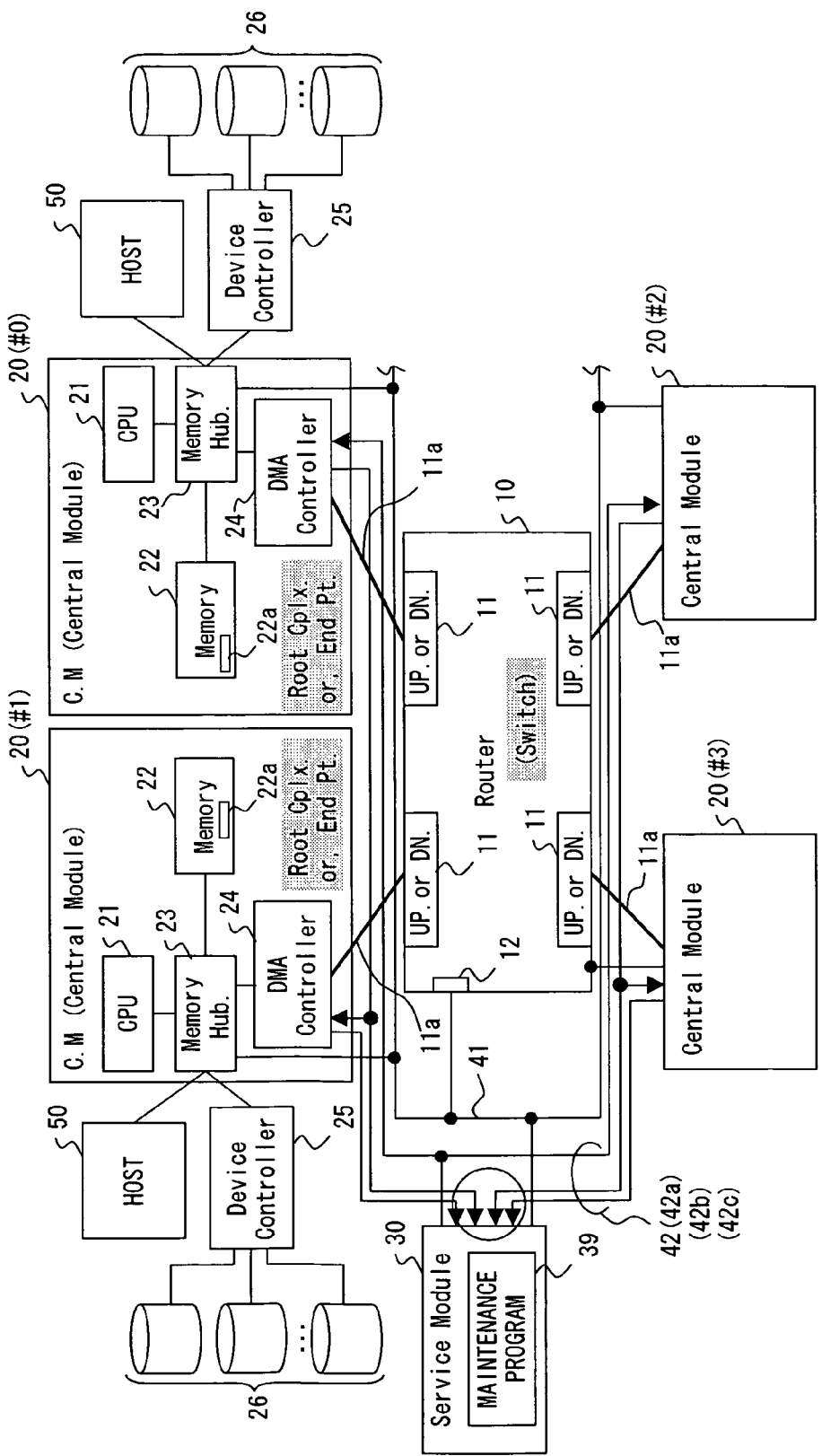
FIG. 2 shows a concept of an example of a configuration of an information processing system according to an embodiment of the present invention.
Figure 3:
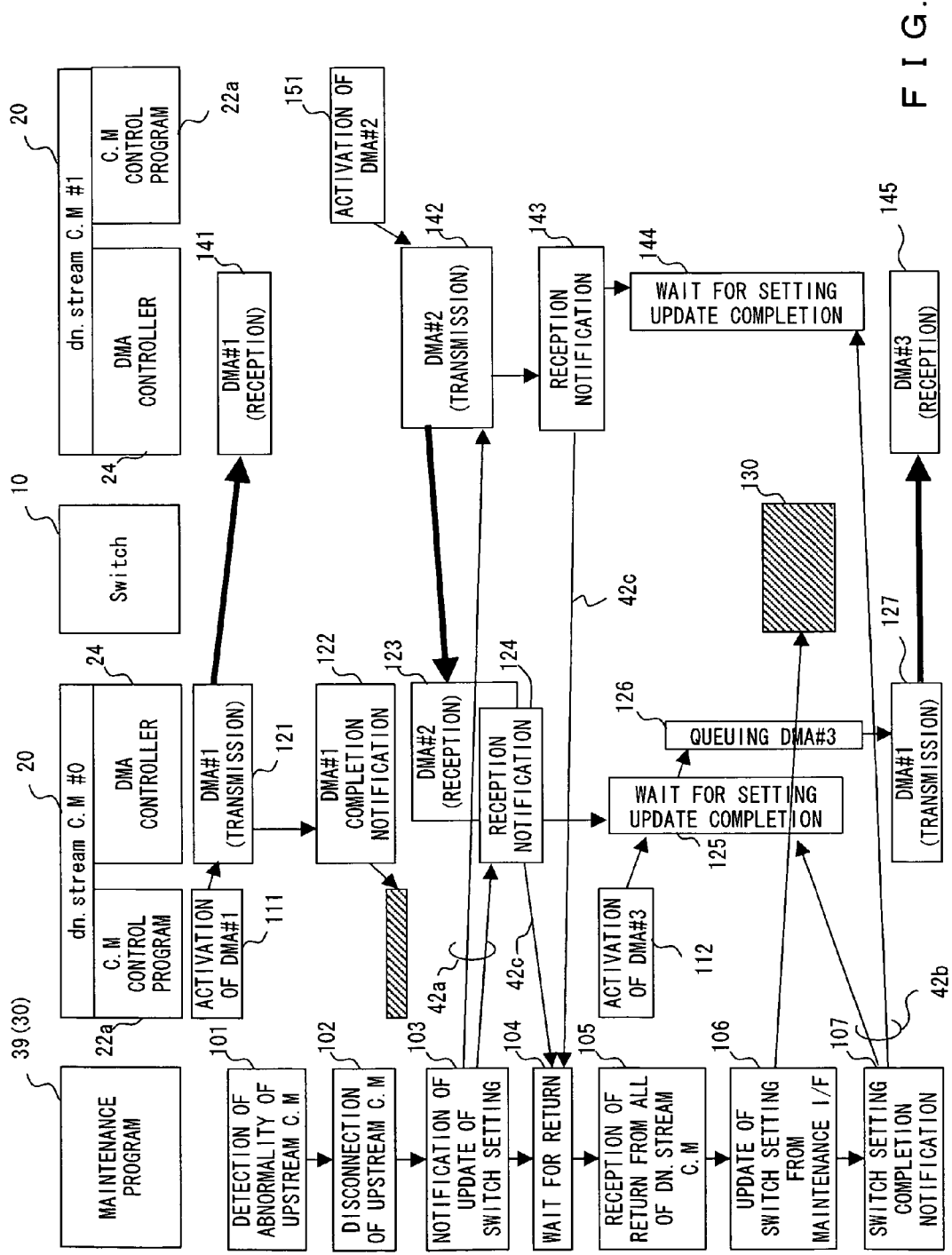
FIG. 3 shows a sequence of an example of operations of the information processing system according to the embodiment of the present invention.
Figure 6:
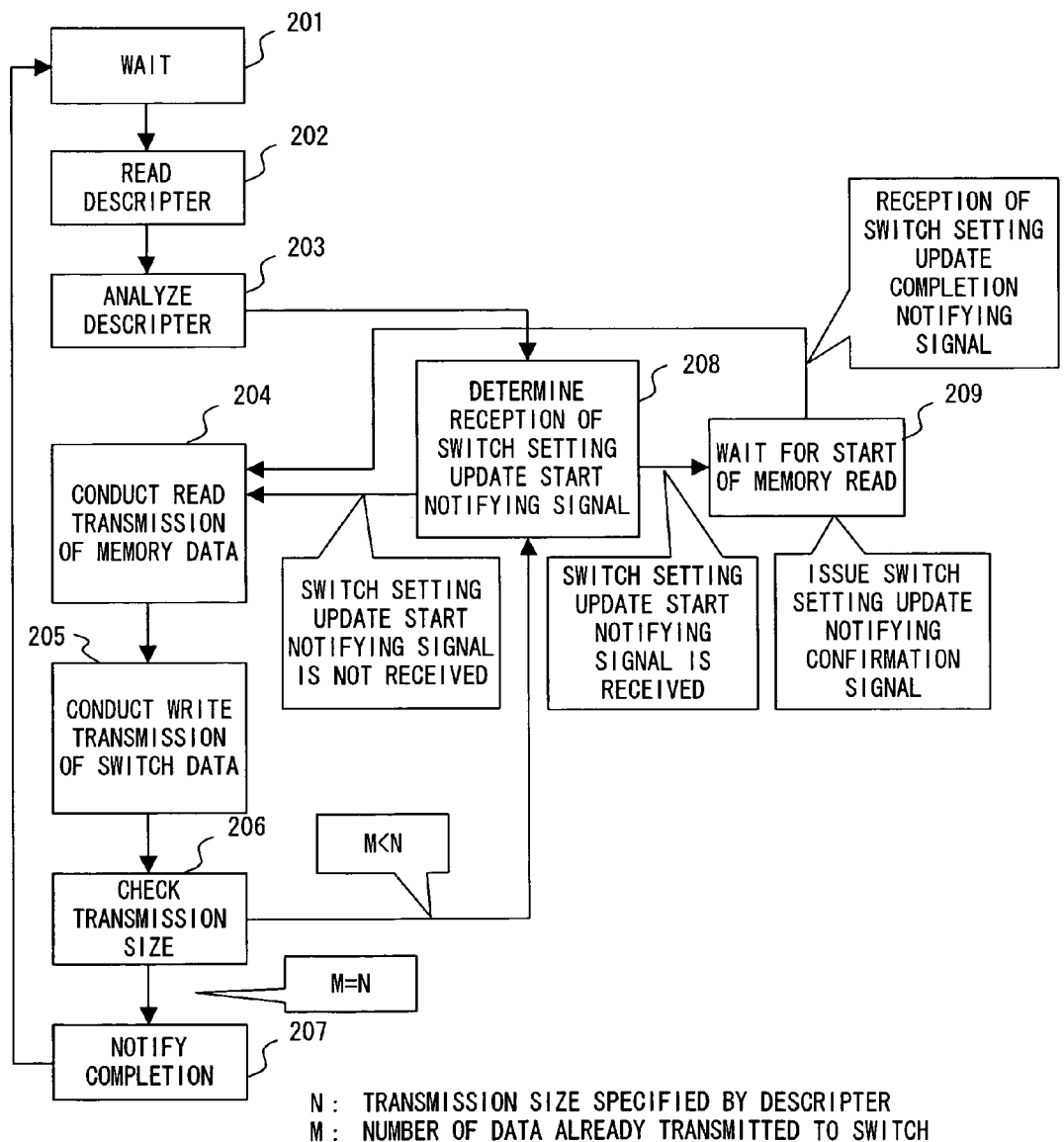
FIG. 6 is a flowchart showing an example of operations of the DMA controller provided in each of the central modules.

FIG. 2 shows a concept of an example of a configuration of an information processing system according to the embodiment of the present invention. FIG. 3 shows a sequence of an example of operations of the information processing system according to the embodiment of the present invention. FIG. 4 is a block diagram illustrating, in more detail, a configuration of a DMA controller provided in apart of a central module, which is an information processing device constituting the information processing system according to the embodiment of the present invention. FIG. 5 is a block diagram showing an example of a configuration of a service module constituting the information processing system according to the embodiment of the present invention. FIG. 6 is a flowchart showing an example of operations of the DMA controller provided in each of the central modules.

As illustrated in FIG. 2, the information processing system according to the embodiment of the present invention comprises a switch module 10, a plurality of central modules 20 independently connected to a plurality of input/output ports 11 provided in the switch module 10 via interface cables 11a and a service module 30 for maintaining and managing the switch module 10 and the central modules 20.

The switch module 10 transmits data among the plurality of the central modules 20 respectively connected to the plurality of the input/output ports 11 by, for example, packet routing, based on the PCI_Express architecture for example.

A maintenance port 12 is provided in the switch module 10, and the maintenance port 12 is connected to the service module 30 via a communication line for maintenance 41. The service module 30 conducts maintenance and management such as, for example, setting of a port number which is uniquely assigned to each of the plurality of the input/output ports 11 in the switch module 10, via the maintenance port 12.

In the switch module 10 of the PCI_Express architecture, one of the plurality of the input/output ports 11 has the property of upstream port, and the rest of the input/output ports 11 have the property of downstream port. Further, unique port numbers are assigned in order to be used for identifying each of the input/output ports 11 by using the input/output port 11 of the upstream port as a reference.

In the embodiment of the present invention, the port numbers are set initially and reset by the external service module 30 via the maintenance port 12.

In the initial state, one of the input/output ports 11 has the property of upstream port. When the upstream port is closed and degenerated (disconnected) due to a fault in the upstream port itself or a fault in the central module connected to the upstream port, one port is determined to be an upstream port out of the other input/output ports 11 having downstream port properties so that by using the new upstream port as a reference, port numbers for all of the input/output ports 11 are reset.

Each of the central modules 20 connected to the switch module 10 comprises a CPU (Central Processing Unit) 21, memory 22, a memory hub 23 and a DMA controller 24.

Information is exchanged among each of the CPU 21, the memory 22 and the DMA controller 24, via the memory hub 23.

A device controller 25 operating under the control of the CPU 21 is connected to the memory hub 23. To the device controller 25, a disk array 26 constituted by a plurality of storage devices in a redundant configuration, and this disk array 26 constitutes a redundant storage system such as RAID-0 to RAID-5 or the like under the control of the device controller 25.

In other words, each of the central modules 20 constitutes a disk array system together with the device controller 25 which is under the control of the central module 20, and the disk array 26. In the above constitution, the central module 20 functions as a cache controller in the disk array system as will be described later.

Further, to the memory hub 23, an external host computer 50 is connected, and the central module 20 controls data transmission processes among the disk array 26, the central module 20 itself, the external host computer 50, and other central modules 20.

In the above case, the memory 22 provided in the central module 20 also functions as cache memory in order to temporally hold data read from the disk array 26 or data to be written to the disk array 26. The control of the memory 22 as the above cache memory is conducted by the CPU 21.

Specifically, in apart of the memory 22, a control program 22a loaded from nonvolatile memory (not shown) connected to the memory hub 23 is stored, and the CPU 21 executes the control program 22a in order that the control of input/output of data between the host computer 50 and the disk array 26 via the cache memory (memory 22), and the control of data transmission between other central modules 20 via the cache memory (memory 22) are executed. As above, the central module 20 also functions as a cache controller.

Each of the central modules 20 is connected to the input/output port 11 of the switch module 10 via the DMA controller 24.

As illustrated in FIG. 4, the DMA controller 24 comprises a memory interface 24a connected to the memory hub 23, a switch interface 24b connected to the input/output port 11 of the switch module 10, a descriptor fetch circuit 24c, a descriptor buffer 24d, a state machine circuit 24e (control logic), data transmission controlling block 24g and a DMA start controlling register 24f.

The CPU 21 writes an activating order (descriptor) to the DMA start controlling register 24f from the memory hub 23 via the memory interface 24a in order to activate the descriptor fetch circuit 24c and the state machine circuit 24e.

The descriptor fetch circuit 24c reads the descriptor from the memory 22 via the memory hub 23 and the memory interface 24a in order to store the descriptor in the descriptor buffer 24d. The state machine circuit 24e analyzes the descriptor stored in the descriptor buffer 24d to order the data transmission controlling block 24g to conduct data transmission. The data transmission controlling block 24g conducts the data transmission between the memory interface 24a and the switch interface 24b upon receiving the order from the state machine circuit 24e.

The data transmission controlling block 24g comprises a memory transmission controlling circuit 24h, a data buffer 24i and a switch transmission controlling circuit 24j.

The memory transmission controlling block 24h is activated by the state machine circuit 24e and conducts data transmission between the memory 22 and the data buffer 24i via the memory interface 24a. The switch transmission controlling circuit 24j is activated by the state machine circuit 24e and conducts data transmission between the data buffer 24i and the switch module 10 (in other words, other central modules 20), in a protocol based on the PCI_Express architecture.

In the above case, the state machine circuit 24e of the DMA controller 24 is connected to the service module 30 via the DMA control communication line 42.

A switch setting update start notifying signal 42a and a switch setting update completion notifying signal 42b are conveyed from the service module 30 to the state machine circuit 24e via the DMA control communication line 42.

The state machine circuit 24e recognizes the switch setting update start notifying signal 42a in order to temporarily stop the data transmission operation in the data transmission controlling block 24g, and has a function for returning a switch setting update notifying confirmation signal 42c to the service module 30. Also, the state machine circuit 24e has a function for recognizing the switch setting update completion notifying signal 42b from the service module 30 in order to restart the data transmission in the data transmission controlling block 24g.

Also, the switch setting update notifying confirmation signal 42c is conveyed from the state machine circuit 24e to the service module 30 via the DMA control communication line 42.

The switch setting update start notifying signal 42a is used by a maintenance program 39 which will be described later in order to notify the state machine circuit 24e of a start of the update of the settings in the switch module 10 which will be described later.

Also, the switch setting update completion notifying signal 42b is used by the maintenance program 39 in order to notify the state machine circuit 24e of the completion of the update of settings in the switch module 10.

Further, the switch setting update notifying confirmation signal 42c is used by the state machine circuit 24e in order to return the reception confirmation of the switch setting update start notifying signal 42a to the maintenance program 39 (service module 30).

As illustrated in FIG. 5, the service module 30 according to the embodiment of the present invention comprises a MPU (micro processor unit) 31, main memory 32, a display 33, a keyboard 34, an external storage device 35, a DMA communication interface 36, a maintenance interface 37 and a bus 38.

The MPU 31 executes the program stored in the main memory 32 (in the present case, the maintenance program 39 etcetera) in order to conduct various operations such as, for example, observation of the operation state of, for example, each of the central modules 20, the setting/update of port numbers in the switch module 10, and control of operation of a part of the DMA controller 24.

The maintenance program 39 comprises fault detecting logic 39a for detecting faults by observing the operation state of each of the central modules 20, a setting update notifying logic 39b for transmitting and receiving the switch setting update start notifying signal 42a, the switch setting update completion notifying signal 42b and the switch setting update notifying confirmation signal 42c, and an identification information updating logic 39c for updating a setting in the switch module 10.

In the main memory 32, information such as the maintenance program 39 executed by the MPU 31 and the data (not shown) or the like is stored. The display 33 and the keyboard 34 provide display information upon operation by a system administrator of the service module 30 and provide a user interface which is needed for input operations of data or commands or the like.

In the external storage device 35, software such as the maintenance program 39 or the like and data are stored in non-volatile storage and the stored contents thereof are loaded to the main memory 32 as occasion demands. Also observation data or the like of the central modules 20 and the switch module 10 is stored in the external storage device 35.

The communication line for maintenance 41 is connected to the maintenance interface 37, for providing a connection interface for transmitting and receiving maintenance and management information between the switch module 10, with the service module 30 connected to the communication line for maintenance 41, and information processing devices such as the central modules 20 and the like.

To the DMA communication interface 36, the above DMA control communication line 42 is connected in order to realize transmission and reception of information such as the switch setting update start notifying signal 42a, the switch setting update completion notifying signal 42b and the switch setting update notifying confirmation signal 42c and the like which will be described later between the above DMA controller 24 provided in each of the plurality of the central modules 20 and the service module 30.

Hereinafter, an example of operations of the information processing system according to the embodiment of the present invention is explained by referring to the sequence diagram of FIG. 3.

As described above, one of the plurality of the input/output ports 11 of the switch module 10 has the property of upstream port, and the others have the property of downstream port. Here, it is assumed that the input/output port 11 to which one central module 20 (the central module #3 in FIG. 2) is connected is the upstream port, and the other input/output ports 11 are downstream ports.

Further, hereinafter, the central module 20 connected to one upstream port (for example, the central module #3) is referred to as "upstream CM", and the other central modules 20 connected to the downstream ports are referred to as "downstream CM".

Further, a process of data transmission conducted in each of the central modules 20 by the DMA controller 24 between the memory 22 and the input/output port 11 is referred to as "DMA#n" (Direct Memory Access) where "n" is a reference number to be used for identifying each of the DMAs.

Firstly, each of the central modules 20 conducts input/output of data in response to an I/O request to the disk array 26 controlled by the central module 20, and made by the host computer 50 connected to the central module 20 itself.

Further, for example when data is to be stored in the plurality of the disk arrays 26 controlled by the central modules 20 in a redundant manner, one central module 20 stores data received from the host computer 50 in the disk array 26 controlled by the central module 20 itself, and also transmits the above data to be written from the DMA controller 24 to other central modules 20 via the switch module 10.

Specifically, in data transmission between, for example, a central module #0 and a central module #1 via the switch module 10, for example, the control program 22a of the central module #0 activates the data transmission process (DMA#1) for the DMA controller 24 controlled by the central module #0 itself (step 111), the DMA controller 24 controlled by the central module #0, upon receiving the above activation, starts the data transmission process (DMA#1) (step 121), and notifies the control program 22a of completion of the DMA#1 when the transmission is completed (step 122).

In the central module #1 on the receiving side of the data transmission process (DMA#1), for example, the DMA controller 24 conducts a receiving process of the data transmission process (DMA#1) (step 141).

Also, in a data transmission from the central module #1 and the central module #0 (DMA#2), the control program 22a of the central module #1 activates the data transmission process (DMA#2) for the DMA controller 24 controlled by the central module #1 itself (step 151), the DMA controller 24, upon receiving the above activation, starts transmission of the DMA#2 to the central module #0 on the opposite side (step 142).

The DMA controller 24 of the central module #1 on the opposite side, upon the start of above transmission, receives the DMA#2 (step 123).

During the data transmission operations as above, the maintenance program 39 of the service module 30 observes operations of the switch module 10 and the plurality of the central modules 20.

When the maintenance program 39 (service module 30) detects an abnormality of the upstream CM (step 101), the maintenance program 39 disconnects the upstream CM (step 102), transmits the switch setting update start notifying signal 42a to the DMA controllers 24 of all of the downstream CMs (step 103), and waits for responses from the DMA controller 24 of each of the downstream CMs (step 104).

The DMA controller 24 of each of the downstream CMs, upon receiving the switch setting update start notifying signal 42a from the service module 30, immediately returns the switch setting update notifying confirmation signal 42c to the service module 30 when a direct memory access process is not in an activated state in the DMA controller 24 (step 124).

When there is a DMA process in an activated state (for example, DMA#2 of the central module #1 in the example of FIG. 3), the DMA controller returns the switch setting update notifying confirmation signal 42c to the service module 30 after the completion of the DMA process (step 143), and waits for reception of the switch setting update completion notifying signal 42b from the maintenance program 39 (step 144).

The DMA controller 24, after returning the switch setting update notifying confirmation signal 42c to the service module 30, queues "DMA#3" (step 126) while waiting for reception of the switch setting update completion notifying signal 42b from the service module 30 (step 125) in the case that the DMA#3 has been activated by the control program 22a of the DMA controller 24 itself (step 112).

The maintenance program 39 of the service module 30, after receiving the return of the switch setting update notifying confirmation signals 42c regarding the switch setting update start notifying signals 42a from the DMA controllers 24 of all of the downstream CMs (step 105), activates the communication line for maintenance 41 connected to the switch module 10 in order to conduct the update of the settings of the port numbers of the switch module 10 (step 106). Upon the above update of the setting of the port numbers, one of the downstream ports is newly determined to be the upstream port (e.g. the input/output port 11 connected to the central module #2) in place of the previous upstream port which is closed (i.e. the central module #3 in this example), and a reset process is conducted in which a new port number is assigned to each of the input/output ports 11 using the newly determined upstream port number as a reference.

The maintenance program 39 of the service module 30, after completion of the update of the settings of the switch module 10, transmits the switch setting update completion notifying signals 42b to the DMA controllers 24 of all of the central modules 20 (step 107).

Each of the DMA controllers 24, after receiving the switch setting update completion notifying signal 42b from the service module 30, starts the DMA#3 which has been queued (step 127), and the DMA controller 24 of the central module #1 as the opposite side receives the above DMA#3 (step 145).

An example of operations of the state machine circuit 24e in the DMA controller 24 provided in each of the central modules 20 will be explained in more detail by referring to the flowchart of FIG. 6.

The state machine circuit 24e waits while observing the writing process of the descriptor in the DMA start controlling register 24f by the control program 22a of the CPU 21 (step 201), and reads the above descriptor from the DMA start controlling register 24f when the writing process in the DMA start controlling register 24f started (step 202) in order to analyze the read descriptor (step 203).

Thereafter, firstly, the presence/absence of the reception of the switch setting update start notifying signal 42a from the maintenance program 39 of the service module 30 is determined (step 208). When it is received, the switch setting update notifying confirmation signal 42c is returned to the maintenance program 39 and also, the data transmission process specified by the descriptor is suspended, thereafter, the data transmission of step 204 is resumed when the switch setting update completion notifying signal 42b is received from the maintenance program 39 (step 209).

On the other hand, when the switch setting update start notifying signal 42a is not received in the step 208, data is immediately read from the memory 22 and a write transmission of data is conducted to the switch module 10 (or the opposite side via the switch module 10) (step 205) by controlling the data transmission controlling block 24g in accordance with the contents of the descriptor. Thereafter, it is determined whether or not the total quantity of data "M" which has already been transmitted is equal to total quantity of data "N" which is specified to be transmitted by the descriptor; in other words, it is determined whether or not the data transmission is complete (step 206). When "M" is smaller than "N" (i.e. the data transmission is not completed), the presence or absence of the reception of the switch setting update start notifying signal 42a of the step 208 is determined, and when the signal is absent, the step 204 and the subsequent steps are repeated.

Also, when the switch setting update start notifying signal 42a is received in the step 208 (is present), the data transmission is interrupted and the operations of the above step 209 are conducted.

When "M" is equal to "N" in the step 206, in other words when the data transmission is complete, the control program 22a of the CPU 21 is notified of the completion of the data transmission and the process returns to the waiting state of the step 201 (step 207).

As described above, according to the embodiment of the present invention, in an information processing system with a configuration in which a plurality of the central modules 20 are connected via the switch module 10, for example, of the PCI_Express architecture so that data transmissions are conducted among the central modules 20, when the upstream port is closed due to a fault or the like of the central module 20 connected to the input/output port 11 with the property of upstream port such that a reset process or the like in which port numbers in the switch module 10 are reassigned is to be conducted, the reset process can be conducted with the entire system in an operating state.

Also, complex processes for synchronizing, with other central modules 20, the halt of data transmission processes due to the update of the settings of the switch module 10 are not required at all for the control program 22a of the CPU 21 in each of the central modules 20 because the update of the settings of the switch module 10 are conducted by a configuration such that the reset of the switch module 10 is conducted after instructing the DMA controllers 24 of all of the central modules 20 to halt data transmission via the DMA control communication line 42 from the maintenance program 39 of the service module 30, and the DMA controllers 24 are instructed to restart the data transmission after the completion of the above reset in order that the update of the settings of the switch module 10 are conducted.

Accordingly, it is possible to realize a degeneracy of the input/output port 11 due to the update of the setting of the switch module 10 without making the control program 22a in each of the central modules 20 complex and also without interrupting operations of the entire system, in an information processing system with a configuration in which the central module 20 is connected to each of the plurality of the input/output ports 11 of the switch module 10.

Accordingly, it is possible to realize a degeneracy of the upstream port in the switch module 10 without making the control program 22a in each of the central modules 20 complex in the PCI_Express architecture in which a plurality of the central modules 20 are connected via the switch module 10 as the PCI_Express switch.

Further, it is expected that the PCI_Express architecture will spread widely so that the switch module 10 based on the PCI_Express architecture can be constructed at a relatively low cost.

Accordingly, by redundantly connecting to one another a plurality of disk array systems each comprising the central module 20, the device controller 25 and the disk array 26 via the switch module 10 which is relatively cheap, a disk array system which realizes reliable operation without suspension can be constructed at a low cost.

It is to be naturally understood that the present invention is not limited to the above configurations illustrated as the embodiments and that various modifications within the spirit of the present invention can be realized.

According to the present invention, it is possible to realize degeneracy of an input/output port without making control software in each of a plurality of information processing devices complex and also without interrupting operations of the entire system in an information processing system with a configuration in which the information processing device is connected to each of the plurality of the input/output ports of routing devices.

Further, it is possible to realize degeneracy of an upstream port in a PCI_Express switch without making control software in each of a plurality of information processing devices complex in a PCI_Express architecture in which a plurality of the information processing devices are connected via a PCI_Express switch.

What is claimed is:

1. A method of controlling an information processing system including a plurality of information processing devices connected to a router, the router including a plurality of input/output ports, each of which respectively function as an upstream port with a first property or as a downstream port with a second property, the method comprising:
    sending update start notice for causing all of the information processing devices to halt data transmission when a fault occurs in an information processing device connected to an upstream one of the input/output ports;
    checking whether a data transfer process between the information processing devices exists;
    sending a confirmation notice that indicates a reception of the update start notice in response to the update start notice when a result of the checking indicates that the data transfer process does not exist;
    completing the data transfer process and sending the confirmation notice after the data transfer process is completed when the result of the checking indicates that the data transfer process exists;
    selecting a downstream one of the input/output ports to become the upstream port after receiving the confirmation notice;
    assigning new port numbers using the selected upstream port as a reference; and
    instructing the information processing devices to restart the data transmission after the assignment of the new port numbers.

2. The method of controlling the information processing system according to claim 1, wherein:
    each of the information processing devices includes a direct memory access control device connected to a central processing unit, memory and at least one of the input/output ports; and
    the direct memory access control device halts a direct memory access process to the memory prior to the assignment of the new port numbers, and also sequentially suspends a plurality of direct memory access processes specified by the central processing unit in order to restart the direct memory access processes after completion of the assignment of the new port numbers.

3. The method of controlling the information processing system according to claim 1, wherein:
    at least one of the information processing devices is a disk array device in which data is dispersedly stored in storage devices in a redundant configuration.

4. The method according to claim 1, further comprising:
    resetting properties of the input/output ports, other than the input/output port with the first property which cannot be used, with the second properties in the routing device before the information processing devices are instructed to restart.

5. The method of claim 1, wherein checking that a data transfer process exits includes determining whether the total quantity of transfer data ("M") is equal to the total quantity of data "N".

6. The method of claim 1, wherein another data transfer process is queued when the another data transfer process is activated after the confirmation notice is sent.

7. An information processing system, comprising:
    a routing device including a switch module of PCI_Express architecture and a plurality of input/output ports each including a first property or a second property, the plurality of input/output ports respectively functioning as an upstream port with the first property or as a downstream port with the second property;
    a first information processing device connected to each of the input/output ports; and
    a second information processing device to conduct maintenance and management of the routing device and the first information processing device;
    wherein the second information processing device includes:
    a fault detecting unit to detect a fault in the information processing device connected to the input/output port with the first property;
    an update notifying unit to notify the first information processing device of the start of update of identification information of the input/output ports and completion of update of the identification information of the input/output ports in the routing device; and
    an identification information updating unit to update the properties and the identification information of the input/output ports with the second properties in the routing device,
    wherein when a fault occurs in the information processing device connected to an upstream one of the input/output ports, the identification information updating unit of the second information processing device disconnects the upstream port with the fault, checks whether a data transfer process between the information processing devices exists, sends a confirmation notice that indicates a reception of the update start notice in response to the update start notice when a result of the checking indicates that the data transfer process does not exist, completes the data transfer process and sends the confirmation notice after the data transfer process is completed when the result of the checking indicates that the data transfer process exists, selects a downstream one of the input/output ports of the switch module to become the upstream port in order to assign new port numbers after receiving the confirmation notice, as the identification information, by using the selected upstream port as a reference.

8. The information processing system according to claim 7, wherein:
   each of the first information processing devices includes a direct memory access control device connected to at least one of the input/output ports; and
   the direct memory access control device includes control logic for halting data transmission to the at least one of the input/output ports when the second information processing device provides the start of update notification, and restarting the data transmission to the at least one of the input/output ports when the second information processing device provides the completion of update notification.

9. The information processing system according to claim 7, wherein:
   at least one of the information processing devices is a disk array system in which data is dispersedly stored in storage devices in a redundant configuration.

10. A computer-readable medium storing a program, which when executed by a computer for maintenance and management of a routing device and direct memory access control devices connected to a plurality of input/output ports of the routing device, causes the computer to perform a method comprising:
   sending update start notice for causing all of the direct memory access control devices to halt data transmission when a fault occurs in an information processing device connected to an upstream one of the input/output ports;
   checking whether a data transfer process between the information processing devices exists;
   sending a confirmation notice that indicates a reception of the update start notice in response to the update start notice when a result of the checking indicates that the data transfer process does not exist;
   completing the data transfer process and sending the confirmation notice after the data transfer process is completed when the result of the checking indicates that the data transfer process exists;
   resetting properties and identification information of the input/output ports other than the input/output port with the first property which cannot be used, in the routing device; and
   causing the direct memory access control devices to restart the data transmission after the reset of the properties and the identification information, and wherein:
   one of the input/output ports functions as an upstream port, and all the others of the input/output ports function as downstream ports; and
   the resetting includes:
      selecting an input/output port functioning as a downstream port, when the upstream port is degenerated, to replace the degenerated downstream port one of the downstream ports in the switch module is selected to be the upstream port after receiving the confirmation notice, and
      assigning new port numbers, as the identification information, using the selected port as a reference.

11. A maintenance and management device included in an information processing system with a configuration in which a plurality of cache controllers each set between a device controller controlling storage devices in a redundant configuration and a superior device are respectively connected to input/output ports with a first property and to input/output ports with a second property of a routing device via a direct memory access control device, and the cache controllers transmit and receive information via the routing device, the maintenance and management device comprising:
   a fault detecting unit to detect a fault of the cache controller connected to the input/output port with the first property;
   an update notifying unit to notify the cache controller of the start of the update of the identification information of the input/output ports and of the completion of the update of the identification information of the input/output ports in the routing device; and
   an identification information updating unit to update the properties and the identification information of the input/output ports with the second properties in the routing device, wherein:
   one of the input/output ports functions as an upstream port with the first property, and all the other ports of the input/output ports function as downstream ports with the second properties; and
   when a fault in the cache controller connected to the upstream port is detected, the identification information updating unit checks whether a data transfer process between the information processing devices exists, sends a confirmation notice that indicates a reception of the update start notice in response to the update start notice when a result of the checking indicates that the data transfer process does not exist, completes the data transfer process and sends the confirmation notice after the data transfer process is completed when the result of the checking indicates that the data transfer process exists, selects one of the downstream ports of the switch module to become the upstream port in order to assign new port numbers after receiving the confirmation notice, as the identification information, by using the selected upstream port as a reference.

12. The information processing system according to claim 11, wherein:
   the direct memory access control device provided in each of the cache controllers includes control logic for accepting notification of reset of identification information of the input/output ports and a notification of completion of the reset in the routing device in order to halt data transmission to the input/output port as a connection destination when the notification of the reset is received, and to restart the data transmission when the notification of completion is received.

13. The computer-readable medium according to claim 10, wherein the routing device includes a switch module of PCI_Express architecture.

14. The method of claim 5, wherein when M=N, returning to a waiting state.

* * * * *